United States Patent [19]

Takatsu

[11] 4,109,899
[45] Aug. 29, 1978

[54] SHOCK ABSORBING DEVICE WITH RESTORING INHIBITING MEANS

[76] Inventor: Suehiro Takatsu, 3-21-6,, Marunouchi, Naka-ku, Nagoya-shi, Aichi-ken, Japan

[21] Appl. No.: 788,770

[22] Filed: Apr. 19, 1977

[51] Int. Cl.² .............................................. F16F 1/36
[52] U.S. Cl. .................................... 267/140; 92/30; 92/187; 267/152; 293/84; 293/89; 403/149
[58] Field of Search .............. 188/1 C, 268, 321, 322; 403/149, 146; 92/30, 84, 187; 293/DIG. 2, 84, 85, 88, 89, 99; 267/114, 116, 139, 140, 152

[56] References Cited

U.S. PATENT DOCUMENTS

| 1,434,803 | 11/1922 | Bloss | 403/146 |
|---|---|---|---|
| 1,435,100 | 11/1922 | Bilterman et al. | 293/84 |
| 1,636,248 | 7/1927 | Schuette | 293/88 X |
| 1,811,152 | 6/1931 | Seversky | 293/DIG. 2 |
| 1,981,870 | 11/1934 | Nagdeburger | 92/84 |
| 2,094,739 | 10/1937 | Geiger | 293/DIG. 2 |
| 3,584,541 | 6/1971 | Cunningham | 92/30 X |
| 3,947,058 | 3/1976 | Laporte | 188/1 C |

FOREIGN PATENT DOCUMENTS

| 2,255,796 | 7/1975 | France | 293/DIG. 2 |
| 2,310,574 | 9/1973 | Fed. Rep. of Germany | 293/88 |
| 211,448 | 4/1968 | U.S.S.R. | 267/152 |

Primary Examiner—George E. A. Halvosa
Attorney, Agent, or Firm—Connolly and Hutz

[57] ABSTRACT

Shock absorber effectively absorbs shock to bumper of automobile by compressive deformation of cushion, regardless of direction from which shock comes. Shock absorber comprises hollow tubular cushion placed within cylinder having one end closed. Plunger fits within open end of cylinder to compress and deform hollow tubular cushion. Shock applied to plunger is mitigated by resistance provided by hollow tubular cushion. Particular structure between cylinder and plunger inhibits sudden return of plunger to original position while providing little resistance on downstroke of plunger.

6 Claims, 3 Drawing Figures

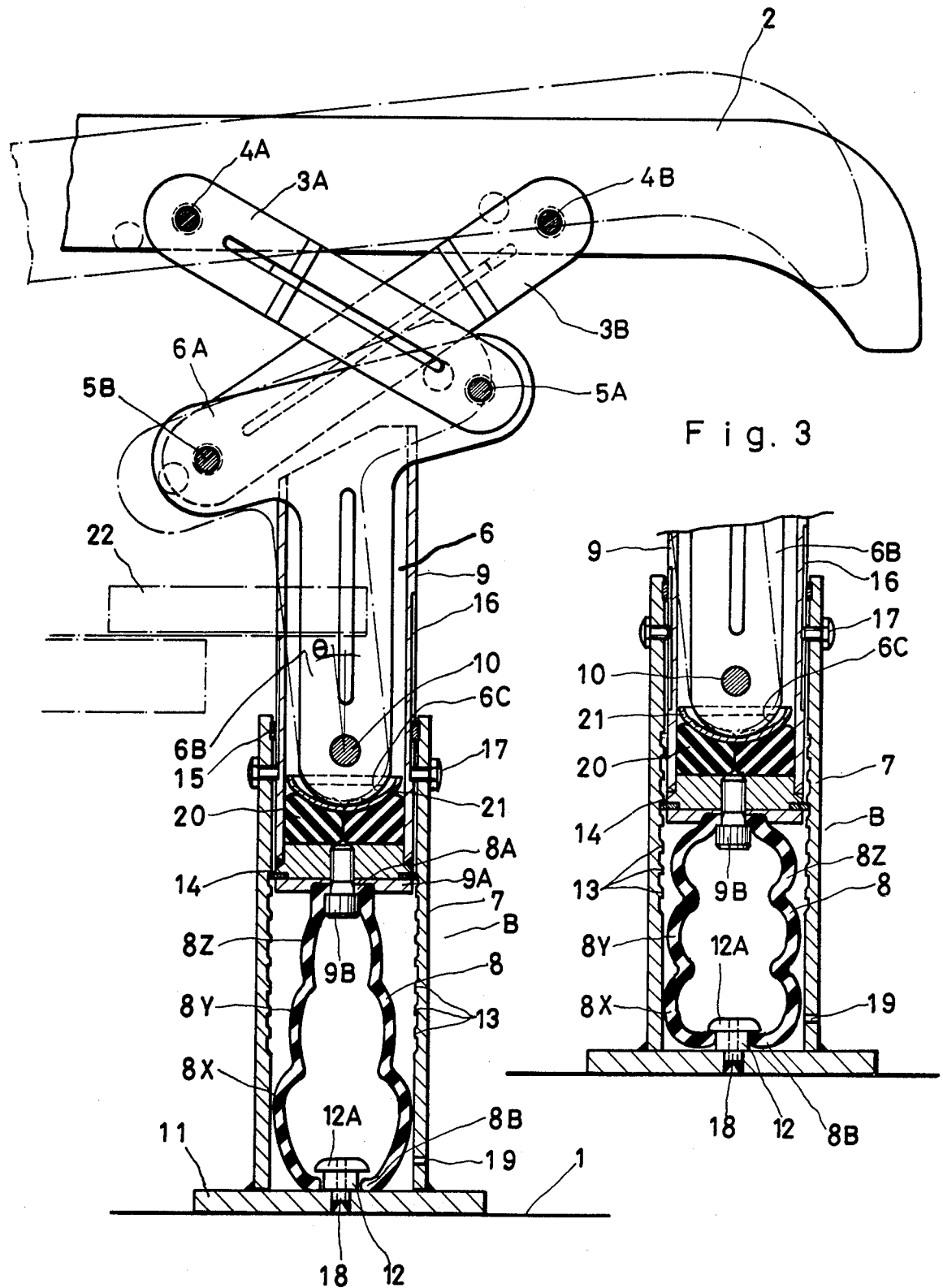

SHOCK ABSORBING DEVICE WITH RESTORING INHIBITING MEANS

REFERENCE TO RELATED APPLICATION

The present application is related to another application entitled "Shock Absorber", Ser. No. 788,766, filed concurrently herewith.

BACKGROUND OF THE INVENTION

The present invention relates to a shock absorber and more specifically to a shock absorber applicable to the body of an automobile.

The body of an automobile is often guarded with bumpers provided at the front and rear so that the driver and passengers may receive less shock from collision. Usually for protection of the driver and passengers from a heavier shock, the bumpers are provided with greater cushioning structure.

In conventional practice, automobile bumpers are supported through a simple cushion by the car body. Thus they are not effective for a shock coming directly from the lateral direction, though they may be fully effective for a frontal shock which occurs in a head-on collision. Meanwhile, presence of a simple cushion between the bumper and the car body may be suitable to mitigate the primary shock of collision but the hazard is inherent that the driver may receive a secondary shock due to a sudden recovery of the cushion from deformation.

SUMMARY OF THE INVENTION

The primary object of the present invention is to provide a shock absorber which effectively absorbs not only a frontal shock but also a shock from the lateral direction.

Another object of the present invention is to provide a shock absorber which effectively absorbs the shock imparted to a cushion by displacement of the bumper under a shock of whatever direction.

Still another object of the present invention is to provide a shock absorber comprising a particularly improved spring for shock absorption.

Still another object of the present invention is to provide a shock absorber which is free from vibration and slackness but with the presence of a cushion between car body and bumper.

Another object of the present invention is to provide a shock absorber which prevents sudden reaction to the primary shock imposed upon the bumper.

BRIEF DESCRIPTION OF THE DRAWINGS

Novel features and advantages of the present invention in addition to those mentioned above will become apparent to those skilled in the art from a reading of the following detailed description in conjunction with the accompanying drawings wherein:

FIG. 2 is an enlarged sectional view of the main part of the shock absorber; and FIG. 3 is a partial sectional view similar to FIG. 2 but illustrating the deformed state of the cushion of the shock absorber.

DETAILED DESCRIPTION OF THE INVENTION

Figure 1:
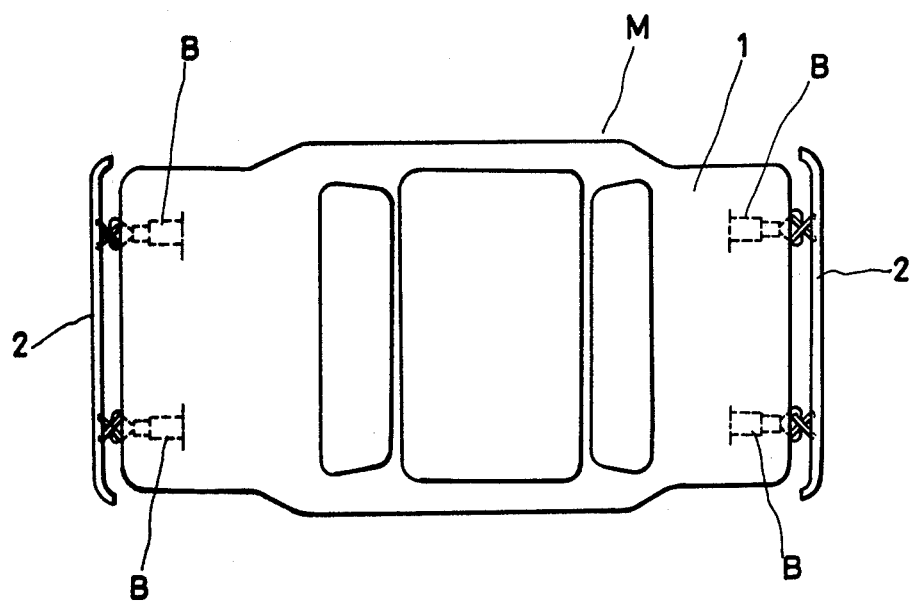
FIG. 1 is a plan view of an automobile using the shock absorber of the present invention.

FIG. 1 illustrates an automobile M equipped with shock absorbers B according to the present invention. The shock absorbers B are installed on both sides of the body 1 at front and rear, and these absorbers elastically support the bumpers 2 installed at the front and rear of the body.

FIG. 2 illustrates a shock absorber B installed at the right front of an automobile. It is seen that the ends of links 3A and 3B crossed in a pair are connected with a specific spacing to the pins 4A and 4B, respectively. The other ends of these links 3A, 3B are fitted to both ends of the stem 6A of the arm 6 by the pins 5A, 5B. The stem 6A is integrated to the base 6B of the arm 6 inclined to the central axis of the body 1 with a spacing from the bumper 2.

The structure of the shock absorber B fitted to the base 6B of the arm 6 is as follows. The shock absorber B is essentially composed of a cylinder 7, a cushion 8 within the cylinder, and a tubular plunger 9. The plunger 9 has a closed end which fits into the cylinder 7 by compressing the cushion 8. The base 6B of the arm 6 is pinned by a pin 10 within the hollow part of the plunger 9.

The cylinder 7 is closed at the lower end by the base plate 11 which is fixed to the automobile body 1. The cushion 8 provided in the cylinder 7 is a hollow body made of an elastic material such as synthetic rubber, preferably polyurethane resin, and it has three parts with the same wall thickness but with different outer diameters. The bottommost part 8X has the greatest diameter followed by the middle part 8Y and the top part 8Z. The top edge 8A of the cushion is supported by a stop screw 9B provided within a recess of the end plate 9A of the plunger 9. The bottom edge of the cushion 8 is bent inward to form a bend 8B. A stopper 12 is provided on the base plate 11 at the bottom open end, as shown.

The stopper 12 has a large head 12A at the upper end and the deformation of the bottom bend 8B of the cushion 8 is prevented by the shank and head 12A of the stopper 12. The inside wall of the cylinder has vertically formed numerous saw-teeth 13 formed thereon. Each tooth 13 is elevated toward the depth of the cylinder and thereby a slope is formed at the open side.

A hard elastic ring 14 made of silicone rubber, for example, is held by the end plate 9A of the plunger 9 and projects therefrom. The ring 14 has some degree of elasticity which enables it to slide over the teeth 13 upon the downward stroke of the plunger, as explained more fully below. The ring 14 is elastically deformed at the position of the saw-teeth 13 and proceeds over them. An O-ring 15 is attached at the open end of the cylinder 7. The inside of the O-ring supports the plunger 9. Also, an open key groove 16 runs longitudinally along the plunger 9 and a pin 17 on the cylinder 7 projects into the groove.

The stopper 12 has an air hole 18 to exhaust the air sealed within the cushion 8, and the cylinder 7 has a similar air hole 19 near the bottom wall thereof. The pin 17 arrests the plunger 9 at the terminal position of the key groove 16 thereby preventing the plunger 9 from slipping out. The key groove 16 is arranged so that the cushion 8 as pushed by the plunger 9 is in a slightly compressed state. Thus, slackness of the plunger 9 within the cylinder 7 is eliminated.

The end 6C of the base 6B of the arm 6 going into the hollow part of the plunger 9 has a curved surface. A cushion 20 made of an elastic material is provided at the bottom of the plunger 9. Between the cushion 20 and the base 6B of the arm 6 a curved dish 21 is inserted to receive the curved end of the arm 6. The arm 6 is held against the cushion 20 and thus with the cushion slightly compressed, the base 6B of the arm 6 bears movably against the inside wall of the plunger 9 by means of the pin 10. Free movement of the arm 6 is prevented by a resistance provided by the cushion 20 thus compressed.

The base plate 11 of the cylinder 7 is fitted to the body of an automobile, while the relevant part of the plunger 9 is movably supported on a bracket 22 fixed to the body, thereby holding the bumper 2 in position. Therefore, when in a collision or the like, a shock is imparted to the front bumper 2. The plunger 9 receiving this shock pushes into the cylinder 7 and thereby compresses the cushion 8, this state being illustrated in FIG. 3.

The deformation of the cushion 8 is followed by an inward flexing of the bend 8B of the bottom part 8X. Then with this bend held by the head 12A of the stopper 12, the part 8X ceases to deform. Thus successive buckling of the parts 8X, 8Y and 8Z makes a long stroke which absorbs the primary shock.

The volume of the cylinder 7 diminishes over the stroke of the plunger 9 and thereby the air sealed within the cushion 8 and in the cylinder 7 is vented to the outside through the air holes 18 and 19. When the plunger 9 is driven into the cylinder 7, the movement meets little resistance because the ring 14 is guided along the slope formed by the teeth 13. However, when the shock imparted to the bumper 2 is removed, the ring 14 is arrested on the elevated side of the teeth 13 and a sudden return to the original position is hindered by this resistance, resulting in a gradual return which prevents a secondary damage by stopping a violent reaction to the shock.

When the bumper 2 receives a slanted shock in the case of an automobile colliding an obstacle ahead in a slanting direction, for instance, the front bumper in FIG. 2 receives a shock at the left position, the bumper 2 will tilt in relation to the body and thereby the links 3A, 3B following this tilting will cause the arm 6B to incline around the pin 10.

When the arm 6 inclines by the angle Q, the end 6C of the base 6B of the arm 6 slides on the dish 21 depending on the angular displacement, whereby the plunger will push into the cylinder 7 depending on the direction of a frontal force acting on the bumper 2. This causes a similar buckling to the cushion 8 to absorb the shock. A sudden reversion to the original position will be hindered by a resistance offered by the teeth 13 engaging the ring 14.

The same effect is also provided when the front bumper 2 receives a local shock or when the rear bumper receives a shock. Whatever the situation of a collision in which the bumper 2 receives the shock, the shock is absorbed by the whole bumper displaced toward the body. In the case of a local shock the component force acting in the cylinder direction becomes a plunger force, which smoothly absorbs the shock.

The above is a description of shock absorption by the shock absorbing device. In the case of a collision in which the force acting on the bumper is relatively heavy, it is possible to trigger another safety device by anticipating the collision in the early stage of collision from the speed of movement of the bumper.

The application of the present invention is not limited to the automobile, but it is notably effective for mitigating a shock to the automobile. Not only a heavy frontal or slanted shock can be reliably mitigated, but also a full cushioning effect can be assured by providing a pair of cushioning devices so that when a lateral shock is received by one device, the cushion in the other device can act to increase the effect.

What is claimed is:

1. A shock absorber comprising a pair of crossed links each adapted at one end thereof for attachment to an automobile bumper, an arm fitted to the other end of each link, a plunger pivotally supporting the arm, a closed cylinder movably holding the plunger, one end of the cylinder adapted for attachment to an automobile body, a flexible cushion internally positioned within the cylinder whereby depending on bumper displacement corresponding to the direction of a shock imparted thereto the arm displaces the plunger and such displacement of the plunger into the cylinder causes buckling of the cushion to thereby absorb the shock, and means for inhibiting, but not preventing return movement between the cylinder and the plunger comprising saw-teeth arranged longitudinally along the inside wall of the cylinder and at least one elastic ring on the plunger projecting outwardly therefrom into engaging relationship with the saw-teeth as the plunger and cylinder move relative to one another, each saw-tooth having an inwardly and downwardly sloping upper surface and a lower surface at substantially right angles to the inside wall of the cylinder.

2. A shock absorber as in claim 1 wherein the arm to which the pair of links is attached comprises a link-fitting stem and a base which fits within the plunger, the link-fitting stem being inclined to the base.

3. A shock absorber as in claim 1 wherein the plunger is a hollow cylinder with one end closed, a block-shaped resilient pad of elastic material inside the hollow cylinder plunger, and a pivotal connection between the arm and the plunger.

4. A shock absorber as in claim 3 including a dish-shaped member between the block-shaped resilient pad of elastic material and the arm.

5. A shock absorber as in claim 1 wherein the cushion is an elastic hollow cylinder comprising three parts with different diameters, each part being independently deformable to buckle.

6. A shock absorber as in claim 1 wherein the cushion is connected in a specifically compressed state to said plunger, thereby limiting maximum shock of said plunger.

* * * * *